United States Patent [19]
Aulgur

[11] Patent Number: 5,803,062
[45] Date of Patent: Sep. 8, 1998

[54] COMPRESSION MOLDED INTEGRATED PERSONAL SERVICE AND OXYGEN MODULES FOR USE IN TRANSPORT AIRCRAFT WITH IMPROVED MASK REPACKING AND TEST ACCESS

[75] Inventor: Charles C. Aulgur, Raytown, Mo.

[73] Assignee: Nellcor Puritan Bennett Inc., Pleasanton, Calif.

[21] Appl. No.: 645,909

[22] Filed: May 14, 1996

[51] Int. Cl.$^6$ ............................................. A62B 7/00
[52] U.S. Cl. ........................... 128/202.26; 128/204.29; 128/205.25; 128/206.27
[58] Field of Search ................. 128/202.26, 202.13, 128/206.27, 205.25, 204.29; 206/570, 438; 220/345, 346, 347, 324

[56] References Cited

U.S. PATENT DOCUMENTS

| | | | |
|---|---|---|---|
| 3,073,301 | 1/1963 | Hay et al. | 128/206.27 |
| 3,503,394 | 3/1970 | Holtz et al. | |
| 3,823,817 | 7/1974 | Hughes | 206/349 |
| 3,981,302 | 9/1976 | Veit | 128/203 |
| 4,009,796 | 3/1977 | Schmidt | 220/345 |
| 4,023,874 | 5/1977 | Jong et al. | 312/291 |
| 4,154,237 | 5/1979 | Courter | 128/203 |
| 4,221,302 | 9/1980 | Kupersmit | 220/345 |
| 4,481,945 | 11/1984 | Levine | 128/206.27 |
| 4,609,166 | 9/1986 | Brennan | 244/118.5 |
| 4,640,278 | 2/1987 | Barry | 128/206.27 |
| 4,710,756 | 12/1987 | Thornburg et al. | 340/628 |
| 4,718,572 | 1/1988 | Gosse et al. | 220/324 |
| 4,840,171 | 6/1989 | Rohling et al. | 128/206.27 |
| 4,909,247 | 3/1990 | Terrisse et al. | 128/206.27 |
| 4,914,781 | 4/1990 | Sokn et al. | 16/225 |
| 5,078,343 | 1/1992 | Howlett | 244/118.5 |
| 5,150,794 | 9/1992 | Rooks | 206/570 |
| 5,156,291 | 10/1992 | Mielke | 220/254 |
| 5,165,625 | 11/1992 | Gutman | 244/118.5 |
| 5,203,467 | 4/1993 | Tucker | 220/254 |
| 5,224,635 | 7/1993 | Wise | 222/608 |
| 5,301,665 | 4/1994 | Jumpertz et al. | 128/202.26 |
| 5,358,139 | 10/1994 | Schnoor et al. | 220/669 |
| 5,376,020 | 12/1994 | Jones | 439/537 |

FOREIGN PATENT DOCUMENTS

| | | | |
|---|---|---|---|
| 1214998 | 11/1959 | France | 128/204.29 |

OTHER PUBLICATIONS

"*SMC Structural Composites: High Strength at Low Cost*"; William I. Childs; Reprinted from Plastics Engineering, Feb. 1989; pp. 37–39.

Product Data Sheet; "*Vinyl Ester Sheet Molding Compound*"; Quantum Composites, Inc.; Feb. 1992, Rev. Nov. 1993.

"*Reinforcements allow designers to tailor materials that will meet specific requirements*"; Machine Design, Jun. 1994; pp. 624–635.

"*Sheet molding compounds (SMC)*"; Modern Plastics Mid–Oct. Encyclopedia Issue; p. 229.

Primary Examiner—Aaron J. Lewis
Assistant Examiner—V. Srivastava
Attorney, Agent, or Firm—Fulwider Patton Lee & Utecht, LLP

[57] ABSTRACT

The compression molded aircraft personal service unit and integrated oxygen module housings are formed by compression molding of a sheet or bulk molding material. The integrated oxygen module can be mounted separately in the aircraft, or can be contained in the personal service unit, and includes a container housing having a multiple release main door, an oxygen generation cartridge removably disposed in the container housing, and an inner mask packing door between the main door and the oxygen masks for aiding in the packing of the oxygen masks in the container. In one embodiment, an external test lever is mounted on the main door, and in an alternative embodiment an auxiliary test deployment tool is insertable through an aperture in the main door for retaining the main door in a partially opened test position.

6 Claims, 10 Drawing Sheets

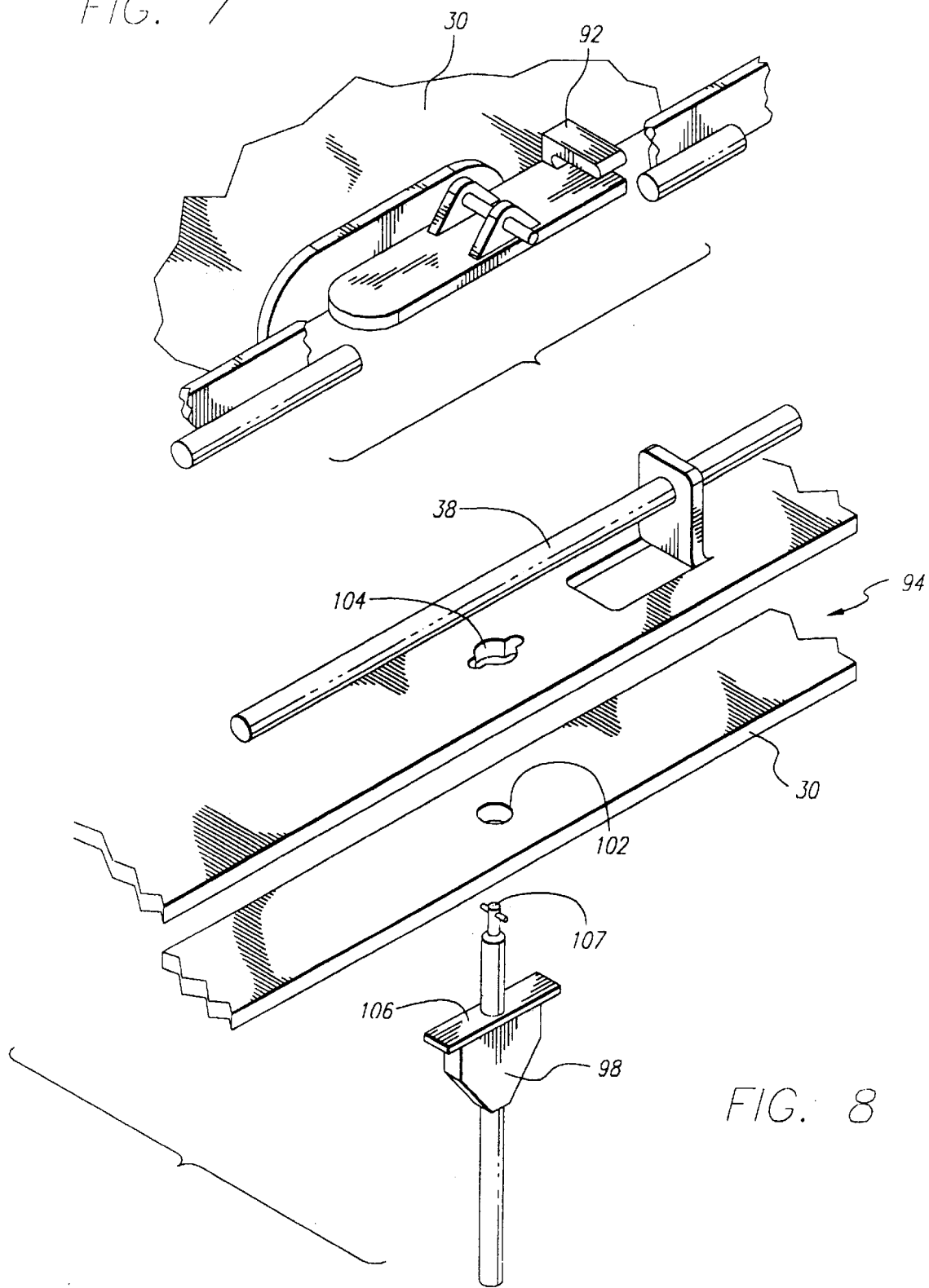

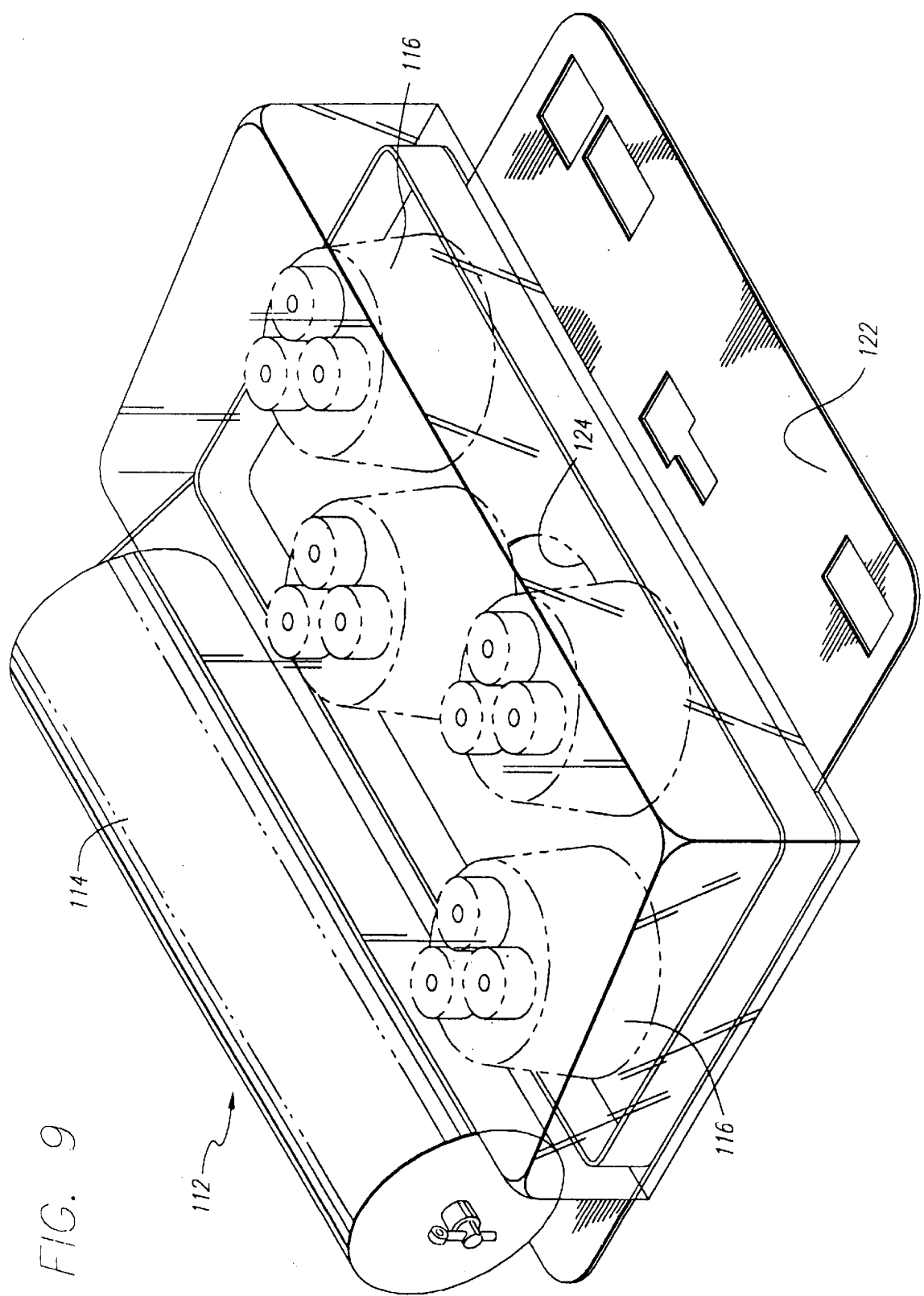

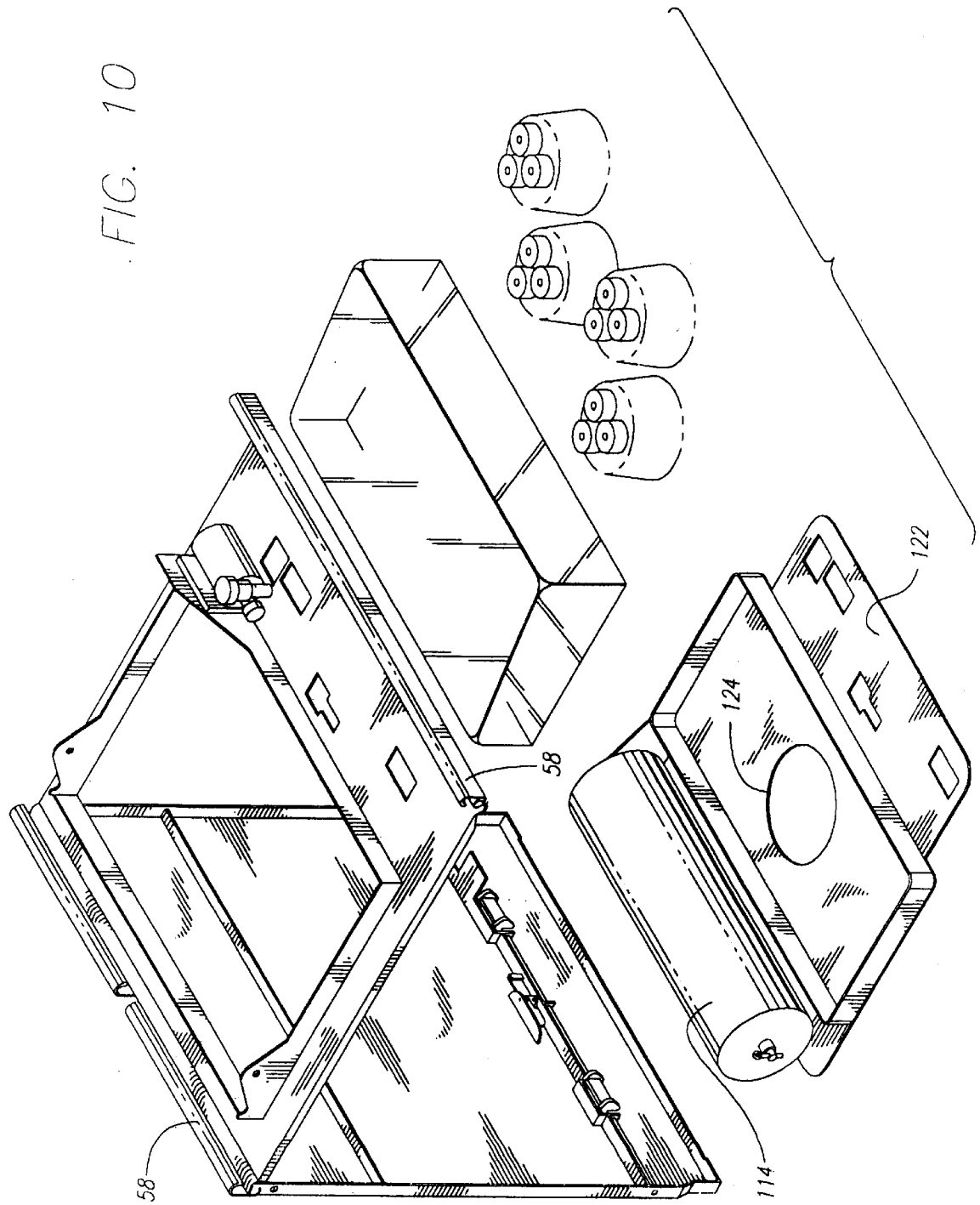

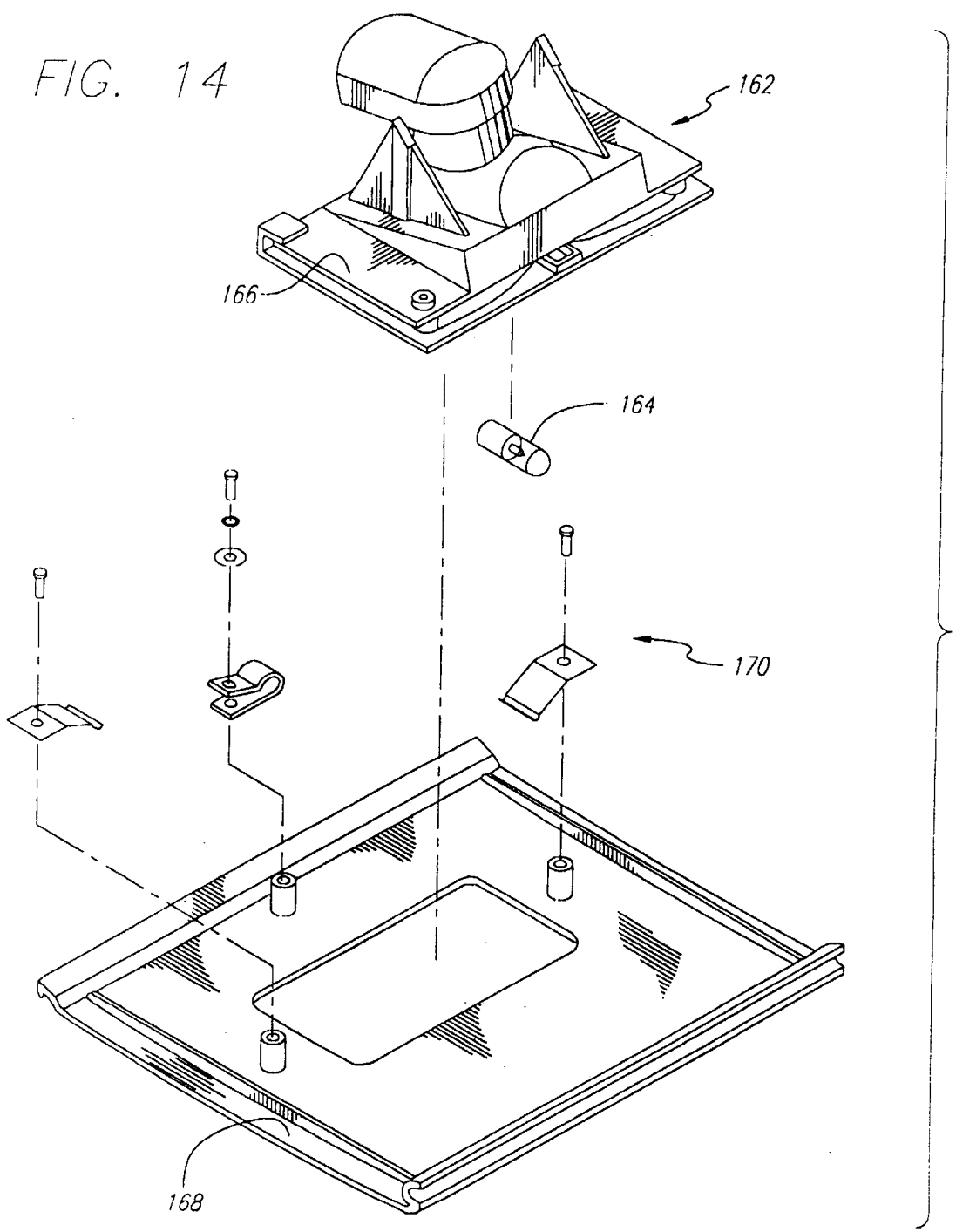

COMPRESSION MOLDED INTEGRATED PERSONAL SERVICE AND OXYGEN MODULES FOR USE IN TRANSPORT AIRCRAFT WITH IMPROVED MASK REPACKING AND TEST ACCESS

BACKGROUND OF THE INVENTION

1. Field of the Invention

This invention relates generally to personal service units and systems for generation and dispensing of oxygen for use in situations of emergency decompression aboard aircraft. More particularly, the invention relates to a compression molded personal service unit for providing services to passengers or crew such as ventilation and lighting, as well as a system for stowing and deploying an oxygen generator and oxygen masks, for use during decompression or oxygen depletion, or other emergencies aboard an aircraft.

2. Description of Related Art

In the course of aircraft operation, passengers and crew aboard an aircraft typically are provided with controllable ventilation, lighting, and emergency oxygen supplies by a personal service unit (PSU) adjacent to a passenger or crew seat. Passengers or crew may require an oxygen supply and mask system to provide breathing oxygen consistent with physiological demands at altitudes of up to 40,000 feet. Provisions for personal service units and modules within such personal service units for stowage and deployment of an oxygen generation and mask system should account for requirements for quick donning of an oxygen mask, the limited space and volume available aboard an aircraft, the desirability of weight reduction, and reliability of the system.

Conventional personal service unit panel assemblies have typically been formed of aluminum sheet metal, thermoformed plastic or injection molded plastic. Panel thickness is dictated by weight constraints for aircraft, and such panels are typically reinforced by a metal or plastic structure bonded to the back side of the panel to provide stiffness and rigidity. This reinforcing structure also typically includes clips, fasteners, and brackets for installation of components such as ventilation outlets, reading lights, wire harnesses, and the like. It would be desirable to provide personal service unit assemblies with a reduced part count, reduced weight, and reduced costs of tooling, materials, and assembly.

Ease of maintenance of emergency oxygen systems is also an important consideration, especially for aircraft that can seat as many as from 300 to 800 passengers. Following a decompression and deployment of oxygen masks, all expended oxygen generators should be removed and replaced, and all of the oxygen masks deployed should be cleaned or replaced. In a conventional system, this requires removing the generator from the oxygen module container, disconnecting the masks, cleaning the masks, re-attaching the cleaned masks to the generators, installing the generator in the container, and repacking the masks.

Current conventional designs for oxygen generation and dispensing modules for aircraft are frequently complicated and have a large number of detailed parts that can decrease the reliability of the system, due to the chances of improper assembly and due to the increased number of potential modes of failure which are generally a feature of complicated designs, and can lead to improper opening of the module door, improper deployment of oxygen masks, entanglement of lanyards and oxygen tubing during deployment, or improper packing or stowage of oxygen masks in the module. It would therefore be desirable to provide an oxygen generation and mask deployment system for aircraft utilizing an oxygen generation cartridge assembly that is removably receivable in an oxygen module in order to reduce the number of parts, weight, and time required for stowing or repacking oxygen modules in an aircraft. Other aids for facilitating, stowing or restowing of oxygen masks in predeployment positions to help ensure proper deployment would be desirable.

It would also be desirable to integrate detailed parts of an oxygen module into a container assembly in order to reduce weight by eliminating part count, fastening hardware and bonding processes for attaching various detailed parts to the container. It would also be desirable to reduce the part count to increase reliability, since there would be fewer parts to fail, deteriorate or malfunction during the service life of the oxygen module.

Conventional oxygen generator and mask systems are typically tested by fully deploying the oxygen masks, requiring tedious restowing of the oxygen masks, which can lead to improper packing and improper deployment. It would be desirable to provide a test system that allows testing for proper functionality of the deployment system without actual full deployment of oxygen masks, while also aiding in the repacking of the masks. Particularly aboard an aircraft where restowing of masks must be done anywhere from 300 to 800 times, the effect of fatigue on increasing the chances of improper packing can be of great importance. It would also be desirable to provide a system for operating a test release of the oxygen masks for a drop test that can prevent the door of the container housing from opening fully when the door latch is released, eliminating the need for repacking of the masks. The present invention meets these needs.

SUMMARY OF THE INVENTION

Briefly, and in general terms, the present invention provides for a new and improved compression molded integrated personal service unit for use in transport aircraft for providing services to passengers or crew, such as ventilation, lighting, and emergency oxygen. In one embodiment, the invention provides for a compression molded integrated oxygen generation and oxygen mask module that can be mounted separately in the aircraft or disposed within the personal service unit, for generating and dispensing oxygen for use in situations of emergency decompression aboard an aircraft. The compression molded personal service unit and integrated oxygen module utilize composite materials, making them lighter in weight. Due to the modular, integrated construction of the oxygen module, fewer separate parts are provided that can interfere with the functioning of doors, hinges and latching and the deployment and stowage of masks. The oxygen module container assembly includes multiple functional elements that are integrally molded into the container body for ease of assembly and lighter weight. The chances of improper deployment of oxygen masks are reduced, since fewer parts are provided on the inside of the container that can become entangled with lanyards or oxygen mask tubing during deployment.

Accordingly, the invention provides for an improved compression molded personal service unit for services such as ventilation, lighting and emergency oxygen. In one presently preferred aspect of the present invention, the personal service unit comprises a housing formed by compression molding of a sheet or bulk molding material, and means disposed in the housing for providing services to a person in the transport aircraft. In one embodiment, the personal service unit can include a compression molded integrated module for producing and dispensing oxygen for use in transport aircraft, comprising a container housing also preferably formed by compression molding of a sheet or bulk molding material, and an oxygen generation cartridge assembly that is removably disposed in the container housing. The oxygen generation cartridge assembly includes an oxygen generator removably disposed in the oxygen module, and oxygen dispensing means to be deployed from the container for dispensing oxygen. The container housing includes a main door, and means for latching the main door in a closed position and for releasing the main door to move to an open position for deployment of the oxygen dispensing means. The main door preferably includes integrated door hinge post receptacles for receiving mounting posts of door hinges. In another aspect of the invention, the container housing can also include integrated profile strips for attachment of lightweight slotted hangers or attachment guides to slide or snap onto the container shell of the module.

In a presently preferred embodiment, the integrated module for producing and dispensing oxygen also includes a mask repacking aid, comprising an inner mask packing door disposed between the main door and the oxygen dispensing means. The inner mask packing door preferably includes an aperture for manual access to the oxygen dispensing means, which is preferably at least one oxygen mask, so that the oxygen masks can be manually packed in the container by access through the aperture in the inner mask packing door.

In another presently preferred aspect of the invention, the integrated oxygen module includes means for testing deployment of the oxygen dispensing means. In one preferred embodiment, an external test lever is mounted on the main door for preventing the main door from opening fully to allow testing deployment of the oxygen dispensing means without requiring repacking the oxygen masks. In another preferred embodiment, the test lever can be located on the container and is accessible through an aperture formed in the main door, to prevent tampering or inadvertent deployment of the system by passengers.

Other features and advantages of the present invention will become apparent from the following detailed description, taken in conjunction with the accompanying drawings, which illustrate, by way of example, the principles of the invention.

BRIEF DESCRIPTION OF THE DRAWINGS

FIG. 7 is a perspective view of the test lever of FIG. 5, shown in an open and/or test position;

FIG. 8 is a perspective view of an alternative test release system, and test deployment tool, for the integrated module of FIG. 1;

FIG. 9 is a perspective view of a container shell and replacement cartridge assembly including a prepackaged generator and a plurality of oxygen masks;

FIG. 10 is a perspective view of the integrated module of FIG. 1, showing the inner mask repacking door for facilitating the repacking of oxygen masks;

FIG. 14 is an exploded view of an aisle light panel assembly for use in the personal service unit of FIG. 11.

DETAILED DESCRIPTION OF THE PREFERRED EMBODIMENTS

Conventional designs for aircraft personal service units and oxygen mask systems for producing and dispensing oxygen in emergency decompression situations typically are complicated and have a large number of detailed parts that can increase the cost of assembly. In such an oxygen supply system, the large number of detailed parts can also decrease the reliability of the system, due to the chances of improper assembly, that can lead to improper opening of the door or improper deployment of the masks, particularly due to entanglement of lanyards and oxygen tubing during deployment. Following a decompression emergency in which oxygen masks are deployed, the oxygen masks need to be cleaned or replaced, and oxygen generators need to be removed and replaced. The repacking of such oxygen modules can be tedious, and can provide an opportunity for improper packing of the oxygen masks, that can lead to malfunctioning of doors, hinges and latching as well as entanglement of lanyards and oxygen tubing that can interfere with later deployment of the oxygen masks. In addition, the multiplicity of parts in such systems can add unnecessary weight to an aircraft.

The compression molded personal service unit of the invention for providing such services as ventilation, lighting and emergency oxygen preferably utilizes composite materials, is lighter in weight, and has fewer parts compared to current conventional personal service units. The oxygen module container assembly of the invention can be mounted separately in an aircraft or contained within the personal service unit, includes features necessary for generating and dispensing oxygen that are integrated into the container body during fabrication of the container, and also preferably utilizes composite materials, is lighter in weight, and has approximately 39% fewer parts compared to current conventional oxygen producing modules. Multiple functional elements are integrally molded into the container body for ease of assembly and lighter weight. The reduction in the number of parts leads to increased reliability, since fewer parts exist on the inside of the container for entangling lanyards or oxygen mask tubing during deployment, and the opportunity for malfunctioning of doors, hinges and latching mechanisms is significantly reduced. The resulting oxygen module is lighter, easier to build, and costs less to produce than conventional oxygen modules. The removable cartridge system containing both the oxygen generator and oxygen masks also decreases the amount of time required for reconfiguring an aircraft by over 50 percent.

Figure 1:
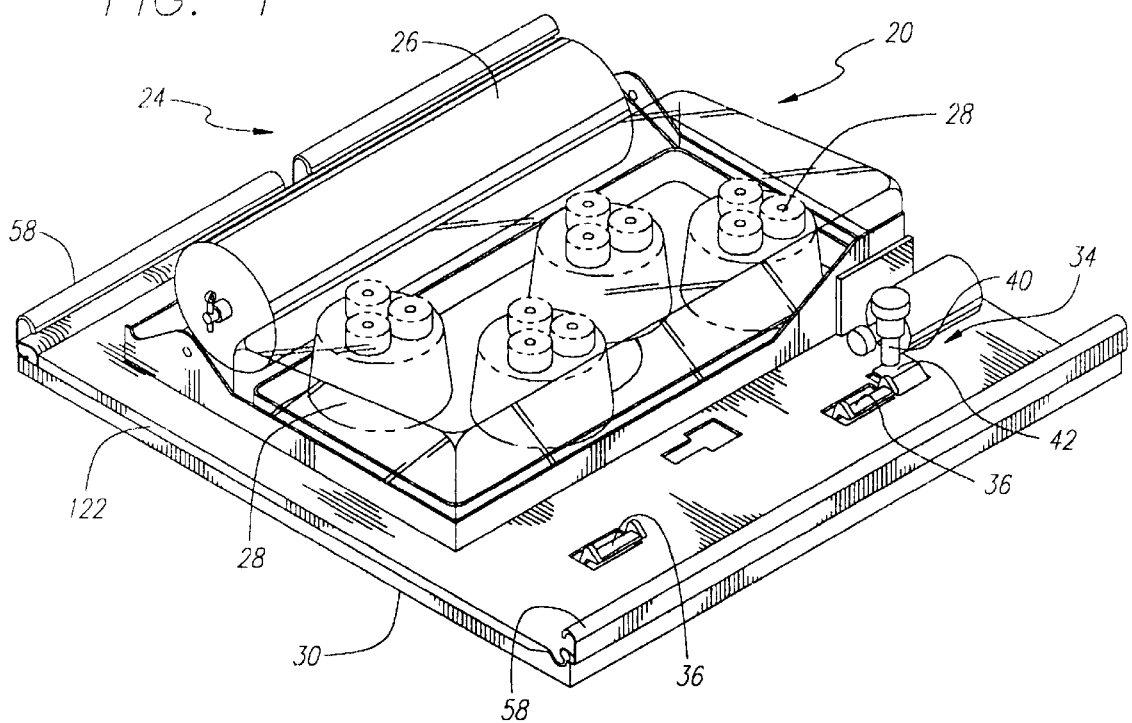
FIG. 1 is a front perspective view of the integrated module for producing and dispensing oxygen for use in transport aircraft.
Figure 2:
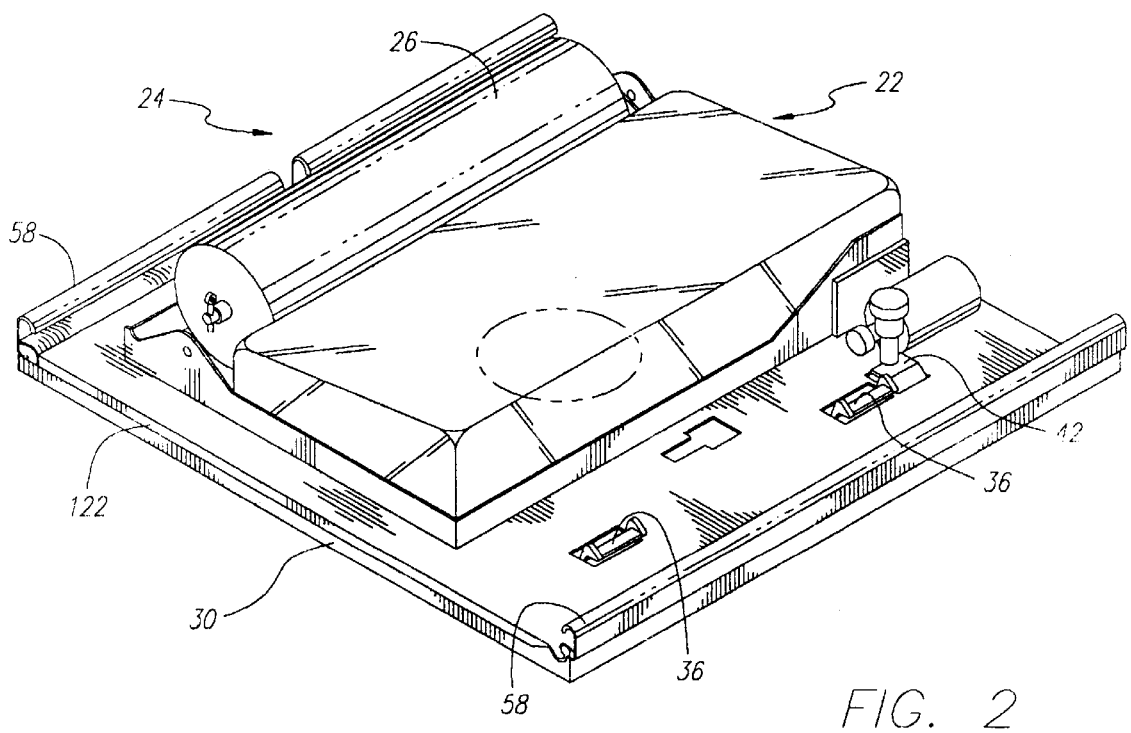
FIG. 2 is a front perspective view of the integrated module of FIG. 1 showing the container shell, with the oxygen masks removed.
Figure 3:
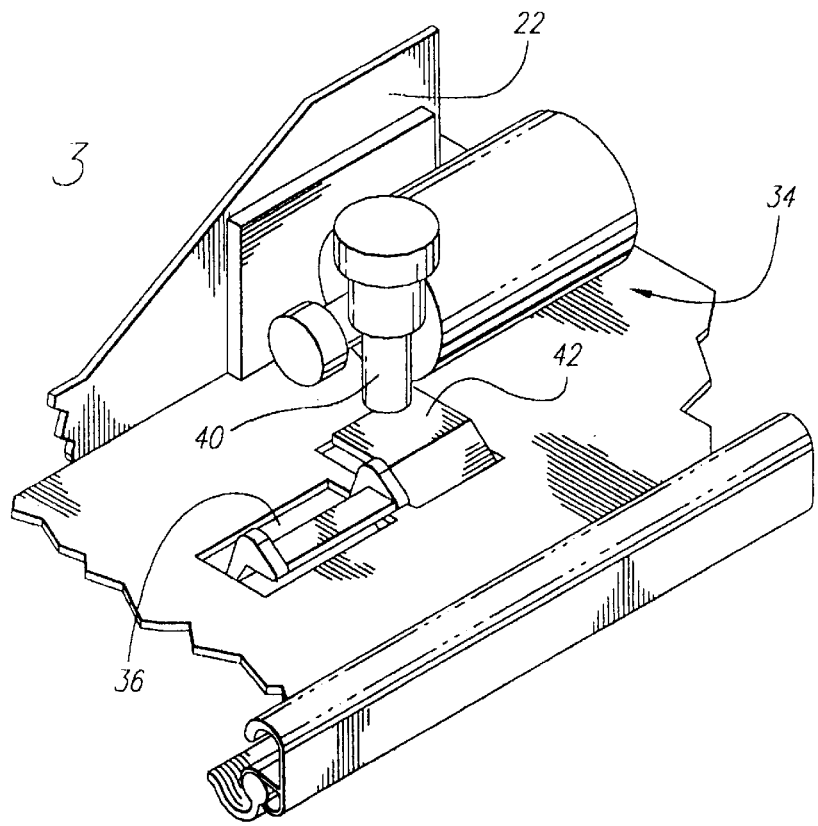
FIG. 3 is an enlarged view of a portion of FIG. 2 showing the striker and release plate of the multiple release door and latch system.

As is illustrated in the drawings, which are provided by way of illustration of the invention and not by way of limitation, in one presently preferred embodiment, the invention provides for an integrated module 20 that can be contained within a personal service unit, or mounted separately in an aircraft, for producing and dispensing oxygen for use in transport aircraft. With reference to FIGS. 1 and 2, the integrated oxygen module includes an oxygen module container assembly 22 and a removable cartridge 24 removably disposed in the oxygen module container assembly, that contains both an oxygen generator 26 and oxygen dispensing means, such as one or more oxygen masks 28. The oxygen masks are typically connected to the oxygen generator for receiving oxygen and dispensing oxygen to a passenger when the emergency oxygen system of the aircraft is activated.

The integrated oxygen module includes a main door 30 hingedly mounted to the oxygen module container assembly. The main container door 30 typically includes a door latch assembly 34, which preferably includes one or more release deployment latches 36 connected to the main door by attachments 44. The one or more deployment latches are connected and driven by a single drive shaft 38, so that when the latch plunger or striker 40 strikes the door release plate 42 also connected to the drive shaft, each of the release latches are released at the same time. The main door 30 also includes door hinge mount receptacles 48, shown in FIG. 5.

In one preferred embodiment, the door and latch system includes two or more release deployment latches. The multiple release door and latch system facilitates the door shutting in a desirable non-bowed configuration, and provides improved reliability due to an increase in a number of latch points from a traditional single point of latching to two or more points of latching in the door. The door latching system is adaptable to containers of different sizes with long door assemblies. As the door assembly length increases on various models of aircraft, the ability to latch the door shut in two or more locations can be significant in eliminating drooping or bowing of the door. The use of a simple striker design that impacts door release plates also improves the reliability of the mask deployment, since no side loads are introduced which could cause the latch to bind during the opening and closing of the door. The tolerance for the latch and door alignment is greatly relaxed, since the latch striker merely strikes the door release plate to release the latch.

Figure 4:
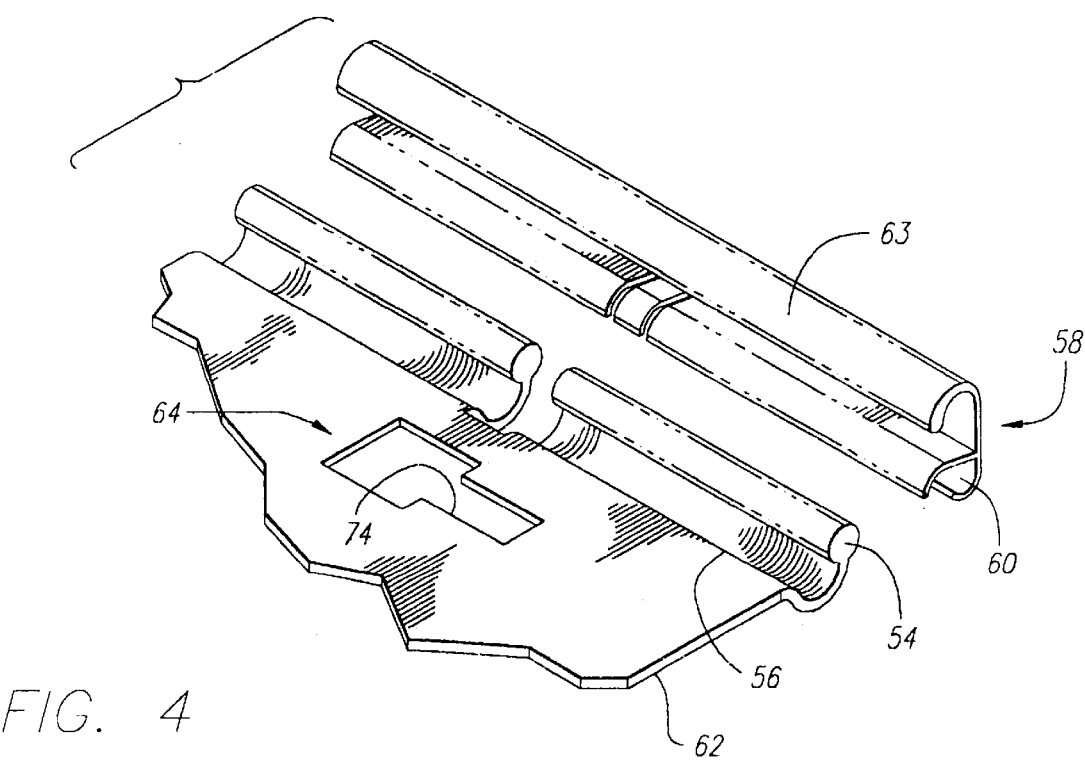
FIG. 4 is a perspective view of an integrated profile strip and attachment guide or hanger for the attachment system for the integrated module of FIG. 1.

As is illustrated in FIG. 4, the attachment system 52 also preferably includes an integrated attachment guide 54 formed on the edge 56 of the container shell 62. A lightweight slotted hanger or profile strip 58 preferably includes an elongated channel or groove 60 to interfit with the integrated attachment guide, so that the profile strip can slide or snap onto the container shell 62, while the other end 63 includes a curved hook portion for engaging a support rail (not shown). The lightweight profile strip is currently preferably formed of aluminum to provide a strong but lightweight profile strip, although other similar strong and lightweight materials may also be used. With the profile strip, a physical force fit is achieved which increases the reliability of the attachment system. This enhances the structural integrity of the module, since no additional mechanical fasteners or adhesives are required.

Figure 5:
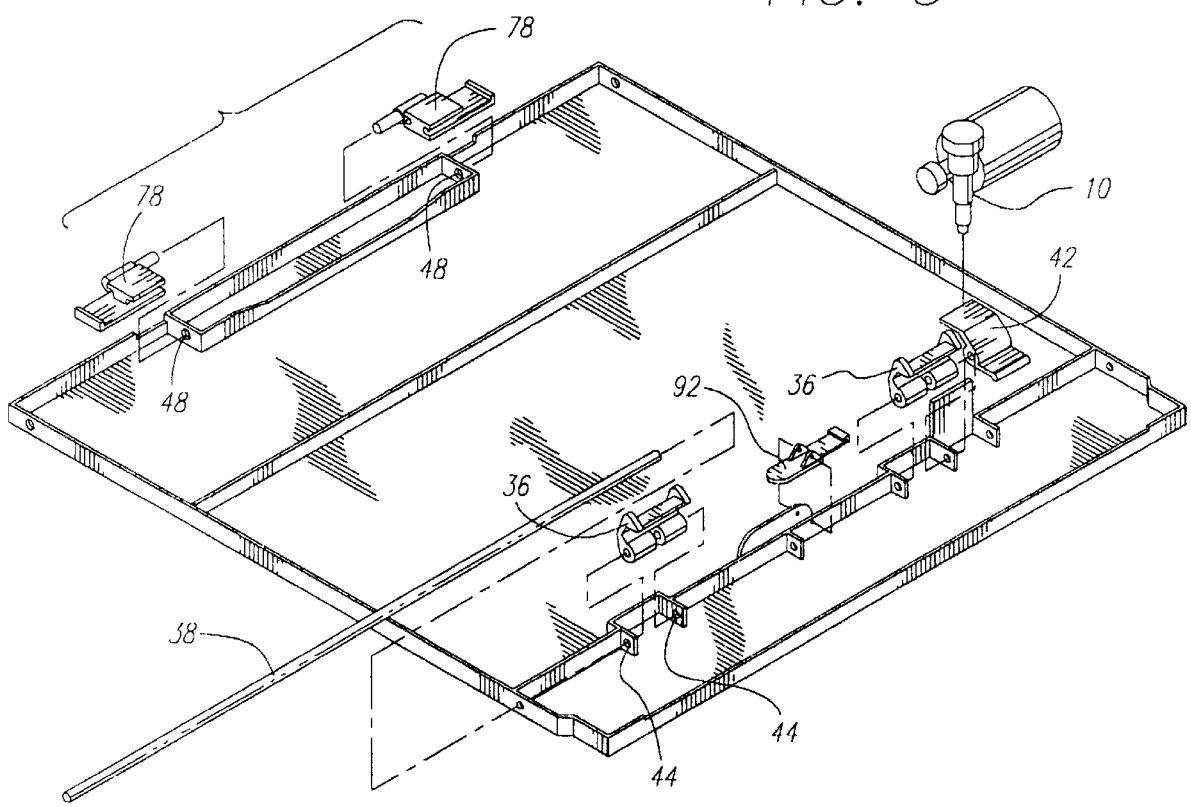
FIG. 5 is a perspective view of the one-piece door, hinge and mounting system, and a test lever assembly in a closed position of a test system of the integrated module of FIG. 1.
Figure 6:
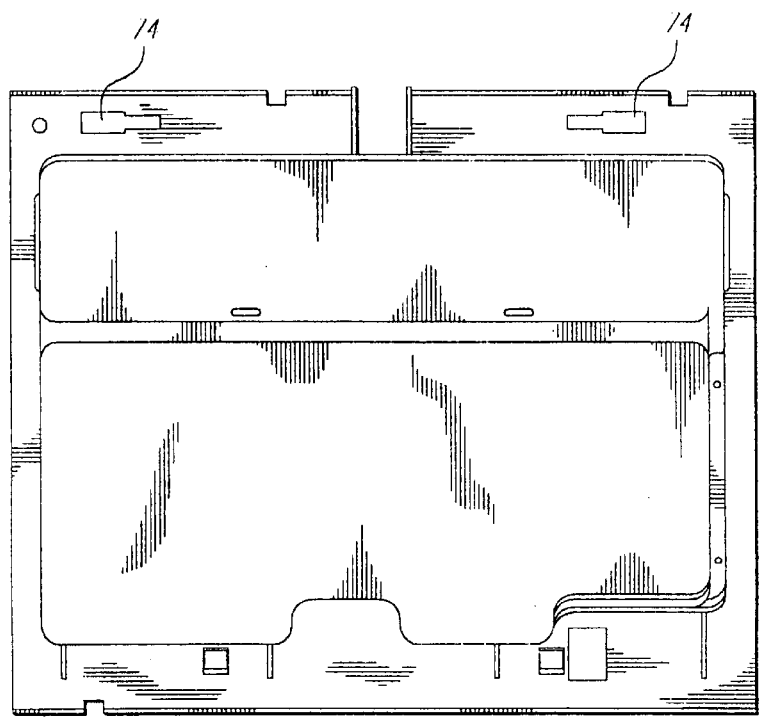
FIG. 6 is a top plan view of the container shell.

The container assembly also preferably includes attachment locations 64 shown in FIG. 4 for unitary door hinge mounts 66, shown in FIG. 5, having door hinge mounting posts 68 that slide into corresponding hinge post mount receptacles 48 in the main door. The one-piece door hinge posts include a locking tab 78 that can fit through and interlock with the hinge receptacles 74 (shown in FIGS. 4 and 6) molded container shell.

The one-piece door hinge mount allows for precise location of the door hinge mounting posts in the container. Since the opening is built into the die used to make the shell, the location of the door hinge mount is precise and repeatable. The door hinge mounting utilizes snap in methodology, which allows the door hinge post to be quickly attached to the container shell assembly. The design of the door hinge mount allows the part to slide into the opening in the container shell and lock into place with no mechanical fasteners or adhesives. It is also relatively easy to remove the door by depressing the locking tab on the door hinge post and disengaging it from the hinge post receptacle molded into the door, which facilitates repair or servicing of the unit in the field. The precise position of the container door permits the door to consistently open and close and line up with door latch assemblies. This also enhances the flatness of the door when closed, which also improves the appearance of the unit in an aircraft.

As is illustrated in FIGS. 5 and 7, a test lever assembly is also preferably integrated into the main door. The test lever can move from a closed position as is illustrated in FIG. 5, to an open or test position as illustrated in FIG. 7, for testing the deployment of the oxygen masks in the integrated oxygen module. Movement of the test lever to the open position prevents full deployment of the integrated oxygen module, also allowing access to the information on the inside of the test lever.

Referring to FIG. 8, an alternative embodiment of a test system 94 is illustrated that is contained inside the integrated oxygen module. The integrated oxygen module typically includes a latch such as an electric latch (not shown) for releasing the main door 30. The remote or auxiliary test deployment tool 98 is a separate tool that is preferably inserted into the opening 102 in the door and through the key shaped opening 104 of the container flange to prevent the full opening of the door. The tool 98 is then typically rotated approximately 90 degrees to prevent removal of the tool from the key shaped hole. The shoulder 106 of the tool is preferably spaced apart from the distal end 107 of the tool such that, when inserted, the shoulder of the tool will prohibit the door of the integrated oxygen module from falling past the required open door test position during testing. This allows observation of successful door opening, and the visual inspection on the edge of the exposed door of such information as the date of generator manufacture, lanyard length, number of masks, and other useful information. In this alternative embodiment, the conventional opening for a test button is eliminated, and the possibility of inadvertent passenger deployment is therefore also eliminated.

Referring to FIG. 9, the integrated oxygen module also preferably includes a replacement cartridge assembly 112 that comprises a prepackaged generator 104, and at least one oxygen mask 116. The cartridge assembly can quickly be changed in the aircraft by dropping the main door of the container and removing the existing cartridge by manually disengaging spring loaded detents (not shown) that hold the cartridge in place. When a new cartridge is in place, the main door is closed and the system is ready for use. This eliminates the need for the tedious procedure of removing the generator separately from the container, disconnecting the masks, cleaning the masks, reattaching the cleaned masks to the generators, installing the generator in the container, and repacking the masks.

In a currently preferred embodiment, the integrated oxygen module also preferably includes a mask repacking door 122, best shown in FIG. 10, that is disposed immediately inside the main door of the oxygen module. With both doors open, the masks are inserted through the opening 124 in the mask repacking door, and the mask repacking door can then be closed. In this manner, masks can be repacked one at a time, and easily positioned on the inside of the mask repacking door, facilitating the proper positioning of the masks during repackaging. The inner mask repacking door also aids the fatiguing task of holding masks in place by hand, because the masks can be supported in place by the repacking door. When the main door is closed after the masks are repacked, the main door engages releases (not shown) that release the mask repacking door. When the oxygen masks are to be deployed, both doors swing open simultaneously.

The integrated mask repacking door is provided in the oxygen module to facilitate restowing of oxygen masks in predeployment positions. This repacking system ensures better stowage and repacking of the oxygen masks, for proper deployment. The test lever system is used to ensure proper functionality of the deployment latch and door opening sequence hardware integrated into the door assembly.

Figure 11:
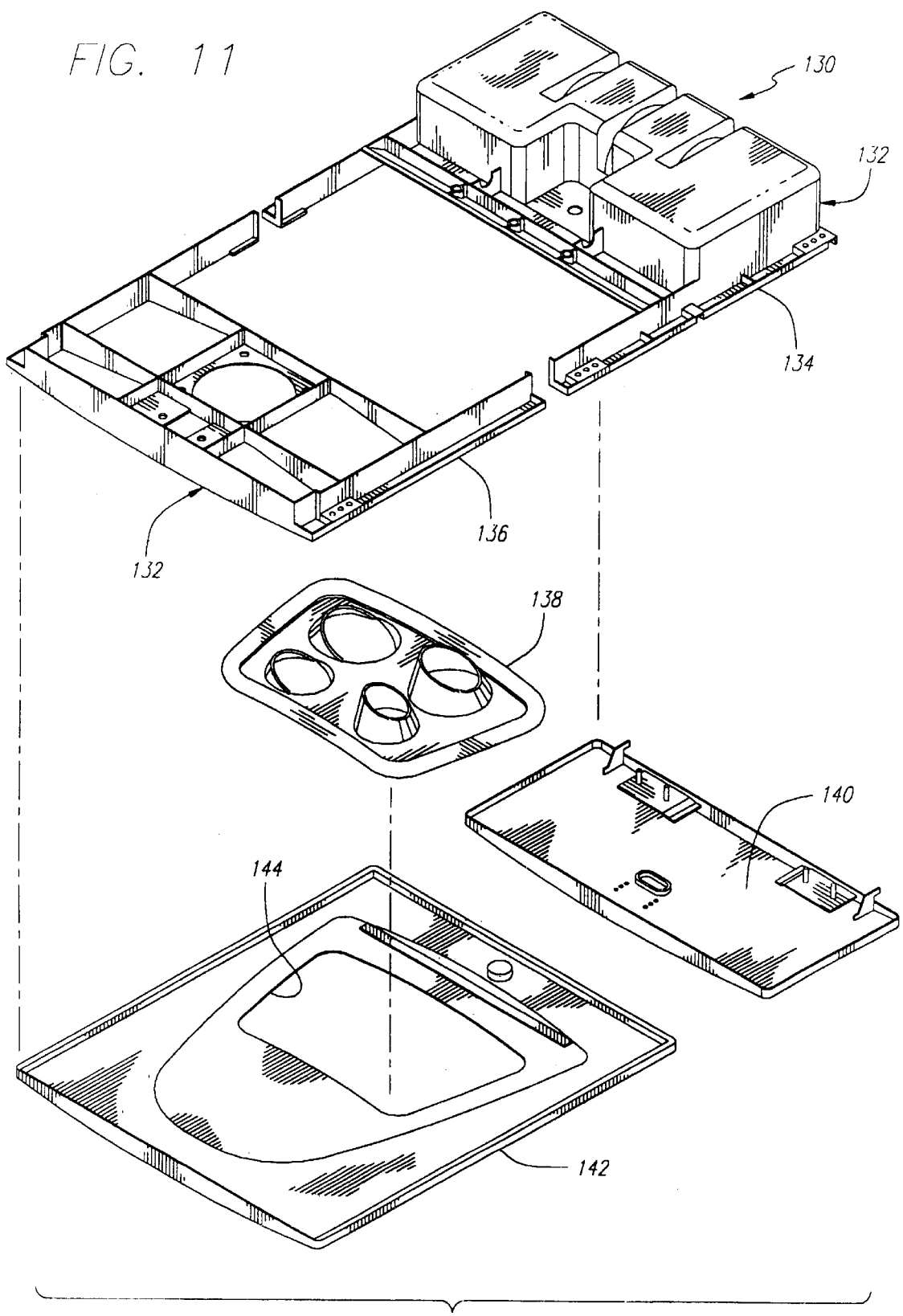
FIG. 11 is an exploded view of a personal service unit according to the principles of the invention, for use in a transport aircraft.
Figure 12:
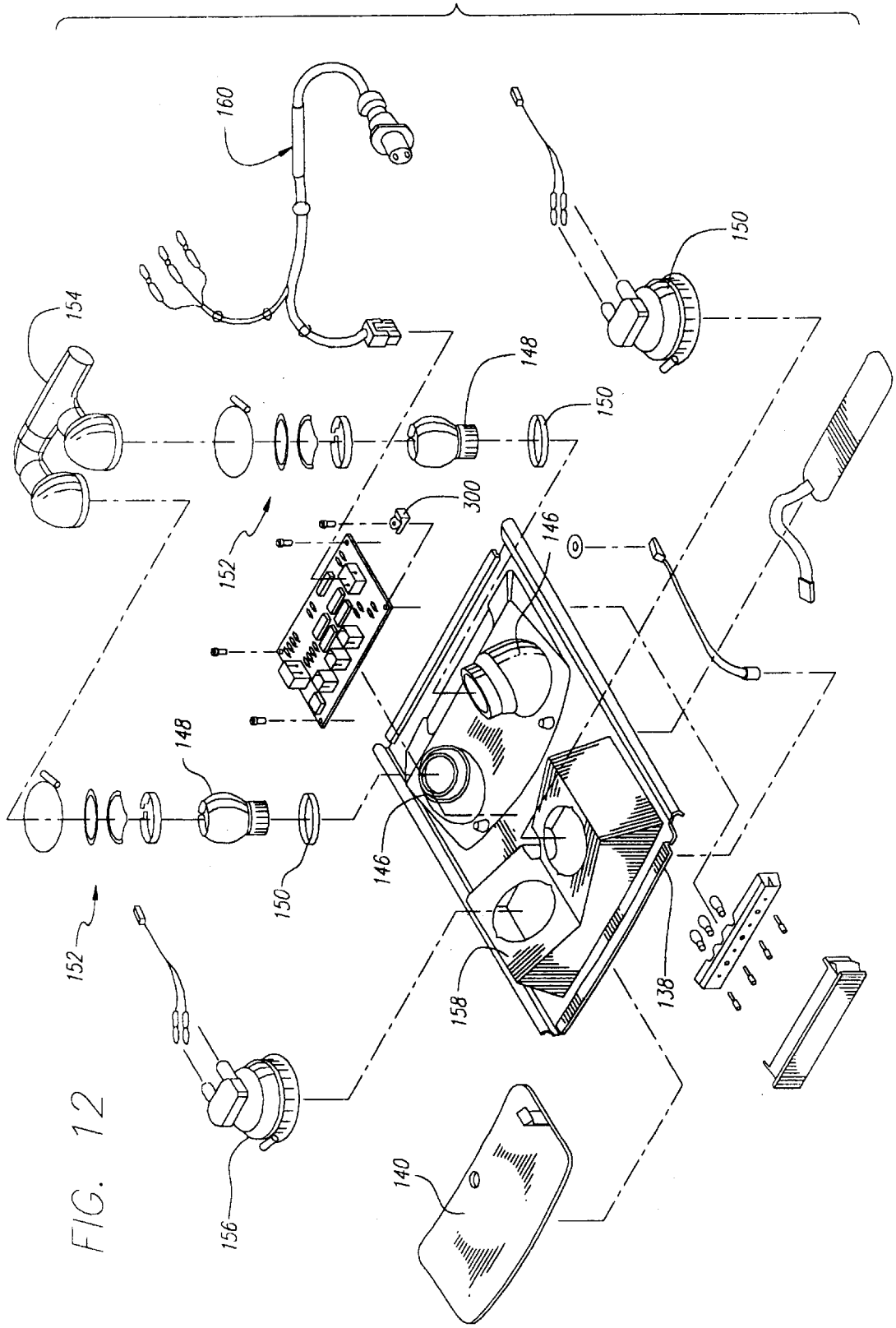
FIG. 12 is an exploded view of ventilation and lighting components of the personal service unit of FIG. 11.

With reference to FIGS. 11–14, in one currently preferred embodiment, the invention comprises a personal service unit 130 that comprises a housing 132 formed by compression molding of a sheet or bulk molding material. As is illustrated in FIG. 11, the housing of the personal service unit can be formed by compression molding interior sections 134 and 136 of the housing, a ventilation port and lighting cover 138, an oxygen mask compartment exterior door 140, and an exterior cover panel 142 having an opening 144 for the ventilation port cover. Means are preferably disposed in the housing of the personal service unit for providing services to passengers or crew in the transport aircraft, such as ventilation, lighting and emergency oxygen. As is shown in FIG. 12, the ventilation port and lighting cover includes ports 146 for moveable ventilation nozzles 148 having an associated gasket 150 for sealing connection of the nozzle to the ventilation port, and associated gaskets 152 for sealing connection of the nozzle to a ventilation supply conduit 154. Lighting assemblies 156 are also provided for insertion in the lighting ports 158 of the ventilation port and lighting cover, along with associated electrical circuitry 160 for connecting the lighting assemblies with the electrical system of the aircraft. A lighting and service control panel (not shown) can also be provided for controlling lighting and other services, such as audio and video entertainment, and may include a call button (not shown) for summoning assistance of an attendant or the like. FIG. 14 illustrates an alternate embodiment of an aisle light 162 having a light bulb 164 and a light mounting assembly 166 for attachment to a lighting cover panel 168 by associated brackets 170 to a lighting cover panel 172 to be mounted in a personal service unit.

Figure 13:
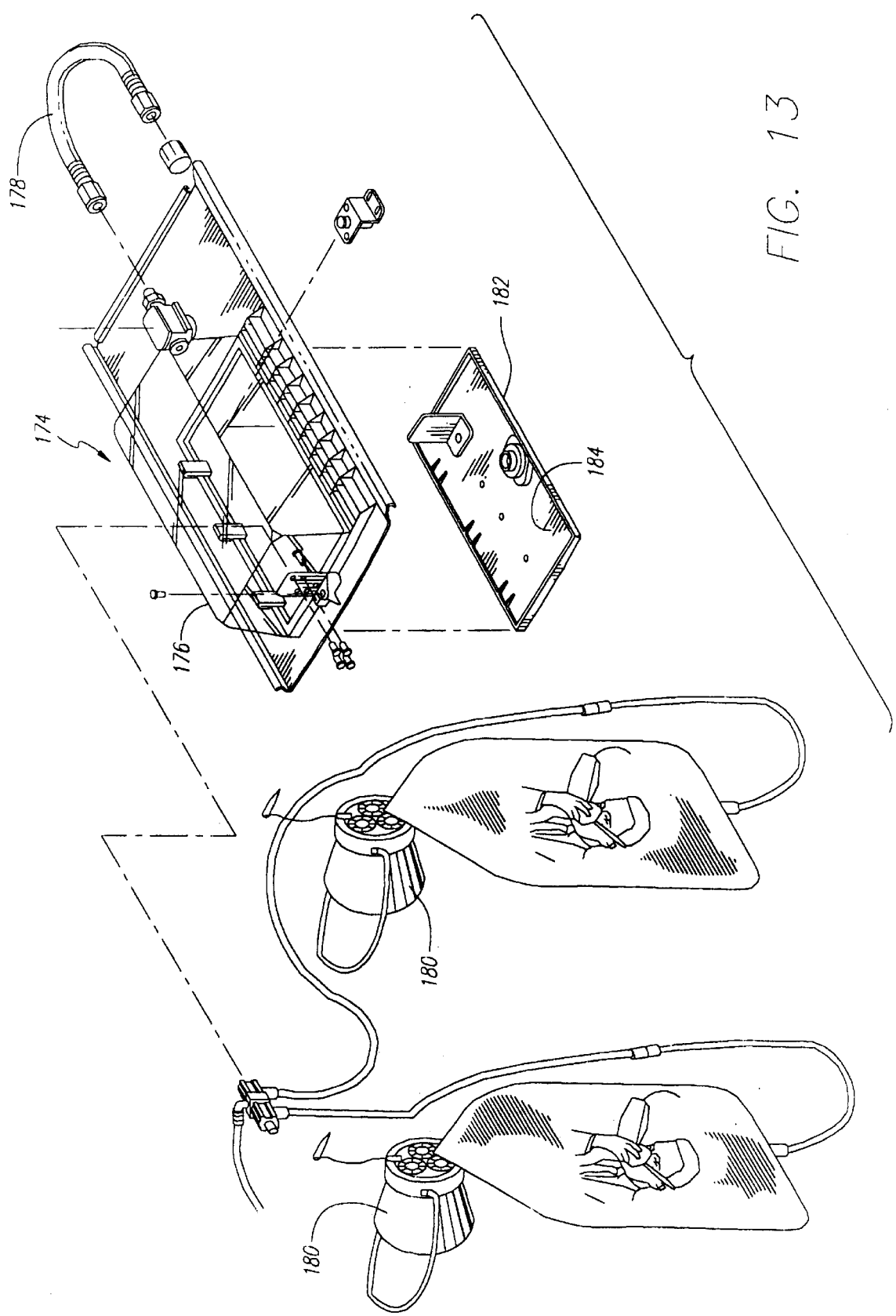
FIG. 13 is an exploded view of an alternative embodiment of an integrated module for producing and dispensing oxygen, for use in the personal service unit of FIG. 11.

In one presently preferred embodiment illustrated in FIG. 13, the personal service unit can include a compression molded integrated module 174 for producing and dispensing oxygen for use in transport aircraft. The oxygen module includes a container housing assembly 176 also preferably formed by compression molding of a sheet or bulk molding material, and can include an oxygen supply line 178 connected to an oxygen generation source (not shown), and oxygen dispensing means, such as one or more oxygen masks 180. The oxygen masks are typically connected to the oxygen supply for receiving oxygen and dispensing oxygen to a passenger when the emergency oxygen system of the aircraft is activated. The integrated oxygen module also includes a main door 182 hingedly mounted to the oxygen module container assembly, and means for latching the main door in a closed position and for releasing the main door to move to an open position for deployment of the oxygen dispensing means. The main oxygen module door also preferably includes room to inscribe information 184 such as the date of the generator manufacturer, the number of masks in the container, and the lanyard lengths inside the container, as well as other useful information.

In a presently preferred aspect of the invention, the personal service unit housing and the oxygen module housing can be formed by compression molding of a sheet or bulk molding material. As is well known in the art, in compression molding, a molding material such as a preshaped part, a volume of molding powder, a viscous mixture of liquid resin and filler material, or a prepreg molding material that can be partially cured is placed in a mold cavity in a lower half of a mold die. Forming of the material is typically accomplished by application of heat and pressure with an upper half of the mold die, similar to forging. The molding material is typically a thermosetting plastic, which is frequently in a partially polymerized state. Cross-linking of the thermosetting plastic is allowed to occur in the heated mold, for a period of time ranging typically from about 0.5 to 5 minutes. One preferred type of sheet molding materials for use in compression molding in the present invention is the type of sheet molding compounds made ready for fabrication by combination of a thermosetting resin with a reinforcing fiber material. Other modifiers can also be included in the sheet molding compounds, as desired, and as is well known by those skilled in the art. One preferred type of sheet molding compound is vinyl ester such as that sold under the trade name QC-8800, available from Quantum Composites, Inc. of Midland, Mich. QC-8800 typically is available in a rolled sheet form approximately 0.125 inches thick, with a glass fiber content of approximately 62 per cent, and glass fibers having a length of about one inch, although other fiber lengths and contents are available. The material can also optionally include a flame retardant, or other modifiers. The material is typically compression molded at a temperature of from about 270° to about 300° F., with a molding pressure of about 300 to about 1,000 psi. A typical 0.25 inch section will cure to a rubbery consistency in about 3 to 5 minutes at a temperature of about 280° F. Other reinforcement materials that can be used include metal fibers, silicon carbide fibers, mineral fibers such as boron, graphite, carbon fibers, aramid fibers, glass spheres and flakes, natural fibers such as cotton or jute, synthetic fibers such as acrylic and rayon, and the like. Other sheet or bulk molding systems that can also be suitable for compression molding in the invention include polyesters, epoxies, phenolics, silicones and polyimides, for example. Compression molding temperatures of 350° F. or higher, and pressures of up to 2,000 psi are typical.

It should be noted that integrating several of the parts into the housing of the personal service unit and the oxygen module container assembly by compression molding of these parts reduces weight compared to conventional personal service units and oxygen module systems, by limiting the part count, fastening hardware and bonding processes for attaching parts to the container. Use of composite materials in the design also reduces weight, while providing strength required for transport aircraft. Reducing the part count increases reliability, since there are fewer parts to fail, deteriorate or malfunction during the service life of the personal service module and integrated oxygen module. Reduction of the number of parts is achieved, since many of the parts are molded, such as in the oxygen module, for example, where many of the parts are molded as part of the oxygen module container shell, such as the attachment guides for the profile strips, attachment locations for the door hinge mounts, attachments for the door latch mechanism and door release hooks, and the door hinge mount receptacles and door release hooks.

Although the embodiments described above have generally utilized a chemical oxygen generator as the oxygen source, it should be recognized that it is possible within the intended scope of this invention to install as an oxygen source a manifold, which is removably connected to a remotely located oxygen supply. The remotely located supply could include any of the oxygen supply means known in the art, such as, for example, a remotely located chemical oxygen generator, a compressed gas container, a liquid oxygen system, a device concentrating oxygen from the air, or a device producing oxygen by the electrolysis of water, or a combination of two or more of such supply means. In such an alternative embodiment, the masks would be contained in the removable cartridge, with a suitable connecting means furnished to connect the masks to the oxygen supply manifold. In another variant of this alternative embodiment, the masks and manifold both would be contained in the removable cartridge, with a suitable connecting means furnished to connect the manifold to the oxygen supply line.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. An integrated oxygen module for producing and dispensing oxygen for use in transport aircraft, comprising:

a container housing having a main door, said main door including means for latching said main door in a closed position and for releasing said main door to move to an open position;

a plurality of door hinge mounts attached to said container housing, and a plurality of door hinge post receptacles molded into said main door for receiving said door hinge mounts;

an oxygen generation cartridge assembly including an oxygen generator removably disposed in said oxygen module, and oxygen dispensing means to be deployed from said container for dispensing oxygen; and an inner mask packing door disposed between said main door and said oxygen dispensing means, said inner mask packing door defining an aperture for manual access to said oxygen dispensing means, whereby said oxygen dispensing means can be manually packed in said container by access through said aperture.

2. The integrated oxygen module of claim 1, wherein said oxygen dispensing means comprises at least one oxygen mask connected to said oxygen generator for dispensing oxygen.

3. The integrated oxygen module of claim 1, further comprising means for testing deployment of said oxygen dispensing means.

4. The integrated oxygen module of claim 3, wherein said means for testing deployment comprises an external test lever mounted on said main door for retaining said main door in a test position.

5. The integrated oxygen module of claim 3, wherein said means for testing deployment of said oxygen dispensing means comprises means for retaining said main door in a partially opened test position.

6. The integrated oxygen module of claim 1, said container housing further including an integrated attachment guide and a profile strip removably disposed on said integrated attachment guide for attachment of said container housing in said transport aircraft.

* * * * *